United States Patent [19]

Wise et al.

[11] Patent Number: 4,860,060
[45] Date of Patent: Aug. 22, 1989

[54] MICROFICHE PRINTING SYSTEM AND METHOD

[75] Inventors: David S. Wise, Solon; Walter E. Janik, Willoughby, both of Ohio

[73] Assignee: Tameran, Inc., Chagrin Falls, Ohio

[21] Appl. No.: 179,507

[22] Filed: Apr. 8, 1988

[51] Int. Cl.[4] .................. G03B 27/52; G03B 27/44
[52] U.S. Cl. ........................... 355/41; 355/45; 355/54; 355/77; 358/233; 358/271
[58] Field of Search ............ 355/5, 8, 11, 53, 54, 355/45, 41, 77, 95

[56] References Cited

U.S. PATENT DOCUMENTS

| | | | |
|---|---|---|---|
| 3,752,558 | 8/1973 | Lloyd | 355/41 X |
| 3,953,123 | 4/1976 | Jesensky et al. | 355/45 |
| 4,073,586 | 2/1978 | Favreau et al. | 355/41 X |
| 4,116,560 | 9/1978 | Dragani et al. | 355/41 |
| 4,170,412 | 10/1979 | Grace et al. | 355/5 |
| 4,174,174 | 11/1979 | Hunter, Jr. et al. | 355/54 X |
| 4,213,696 | 7/1980 | Wise | 355/45 |
| 4,241,992 | 12/1980 | Flint et al. | 355/41 |
| 4,287,564 | 9/1981 | Swift et al. | 355/95 X |
| 4,783,685 | 11/1988 | Kahle | 355/45 |

*Primary Examiner*—Richard A. Wintercorn
*Attorney, Agent, or Firm*—Calfee, Halter & Griswold

[57] ABSTRACT

A microfiche printing system and method includes an optical system operative to scan and temporarily record microfiche image edge data on a high speed row scanning stroke of a microfiche sheet and to print the row of microfiche images onto plain paper on a printing stroke of the microfiche sheet using the temporarily recorded data automatically to control microfiche image masking. The optics system includes a shutter/mirror assembly having a shutter movable between an open position for printing microfiche images aligned with the optics in the printing stroke and a closed position to block the light path of the optics system edge masking functions in the printing stroke and for diverting the image for edge sensing functions in the scanning stroke. The optics system further includes two edge masks synchronously driven toward and away from one another, the edge masks including guided leads of narrow film strips reciprocally oppositely driven by rotatable spaced spools powered by stepper motors to control the spacing between the guided leads during the printing stroke to mask the microfiche image optics in accordance with edge data temporarily recorded during the scanning stroke.

13 Claims, 6 Drawing Sheets

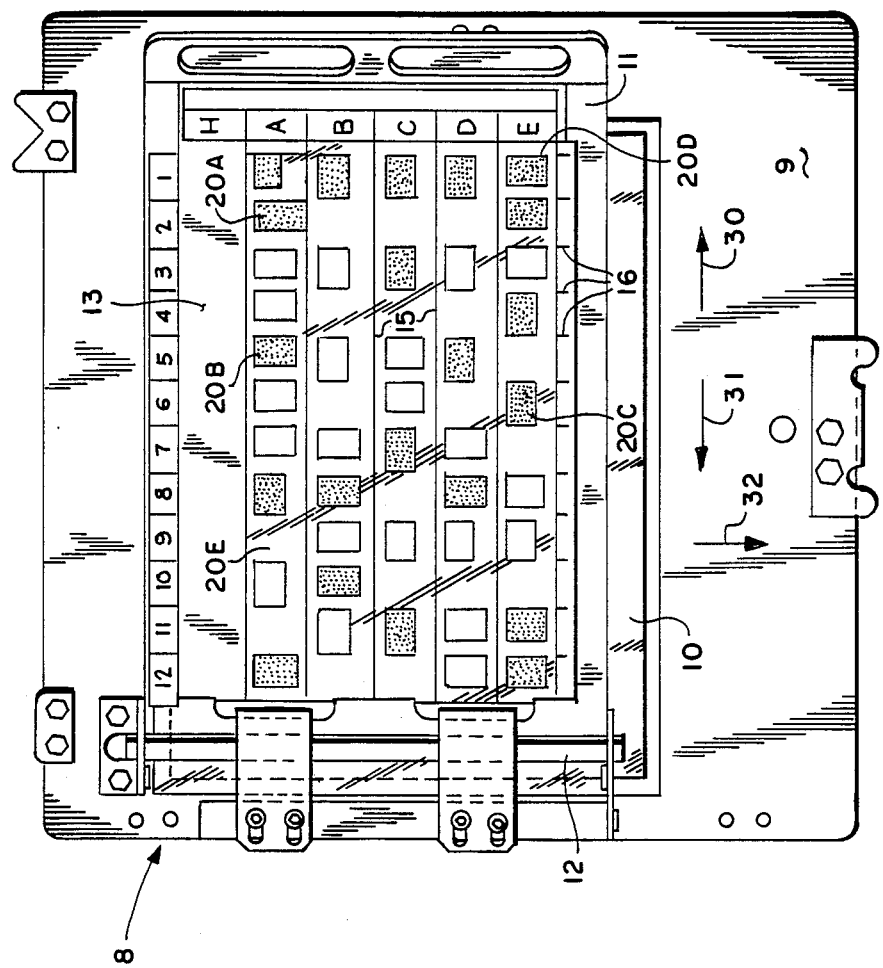

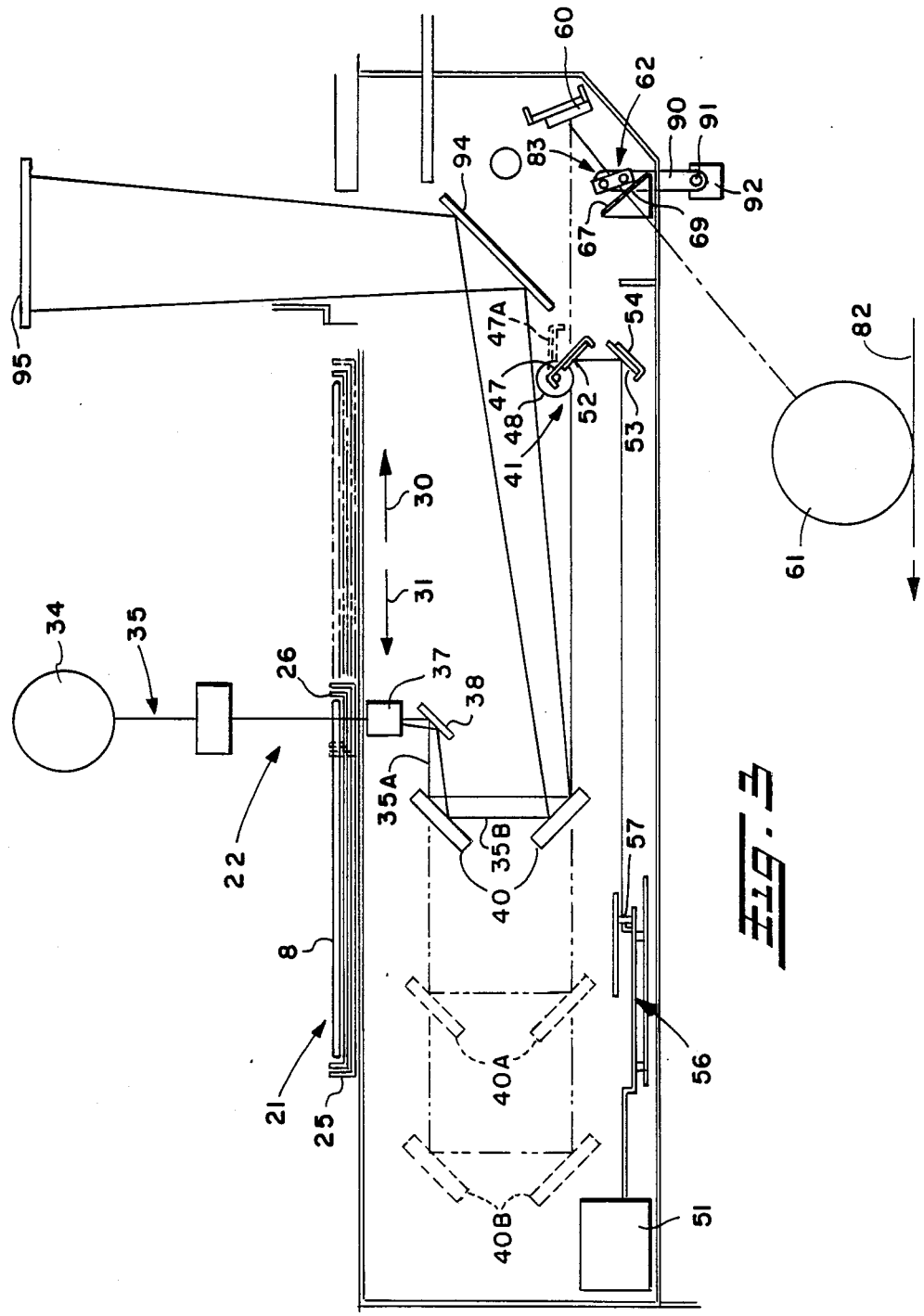

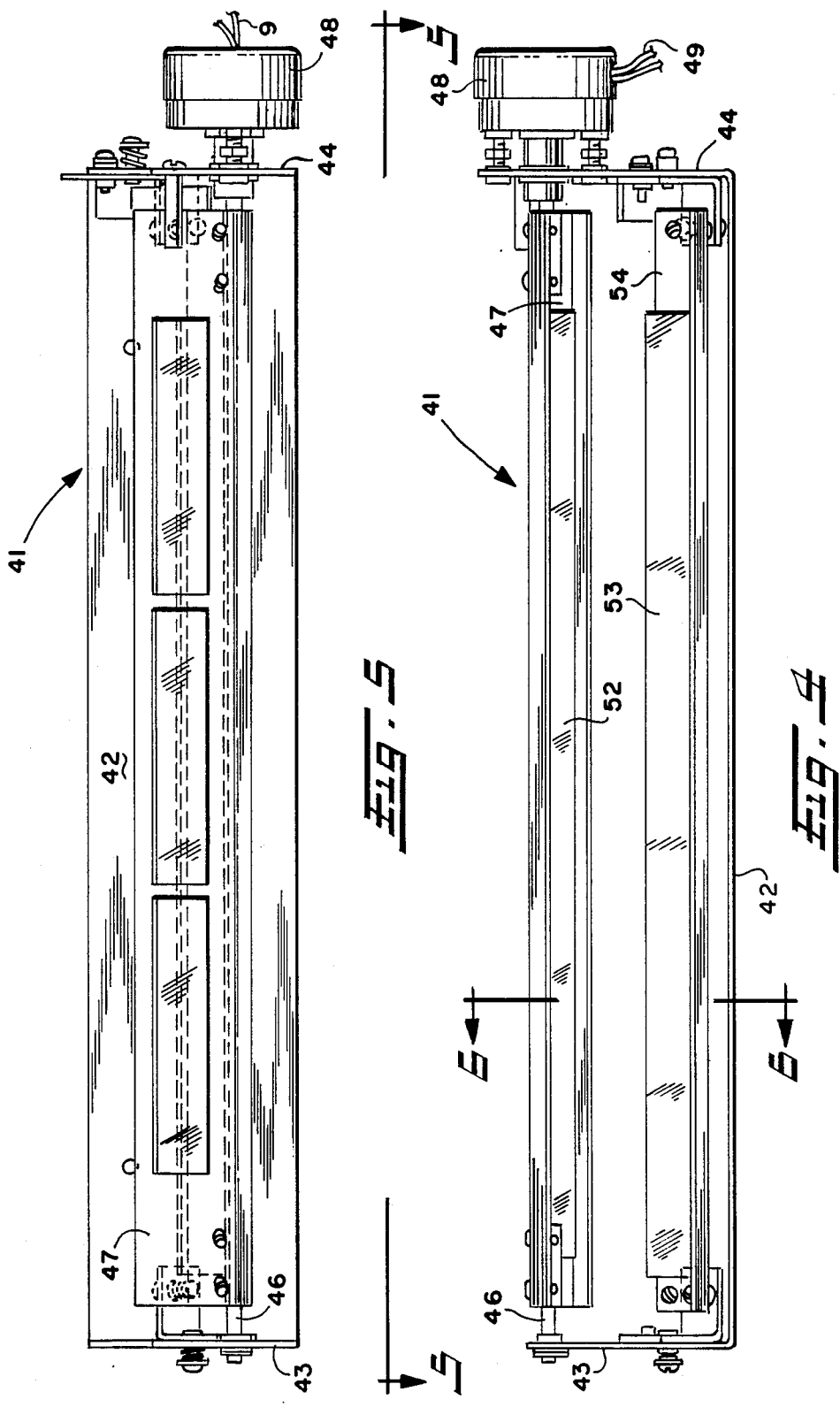

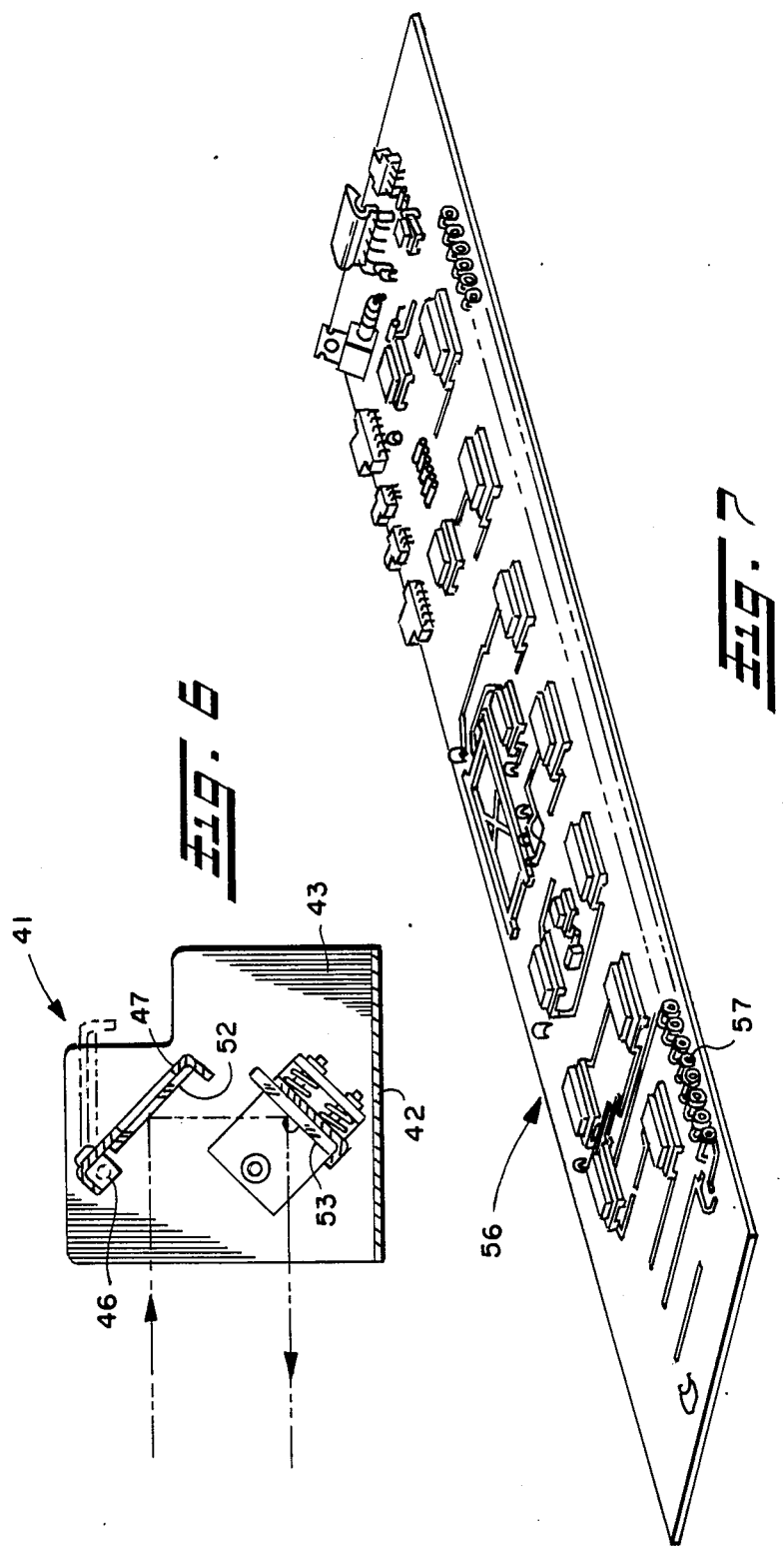

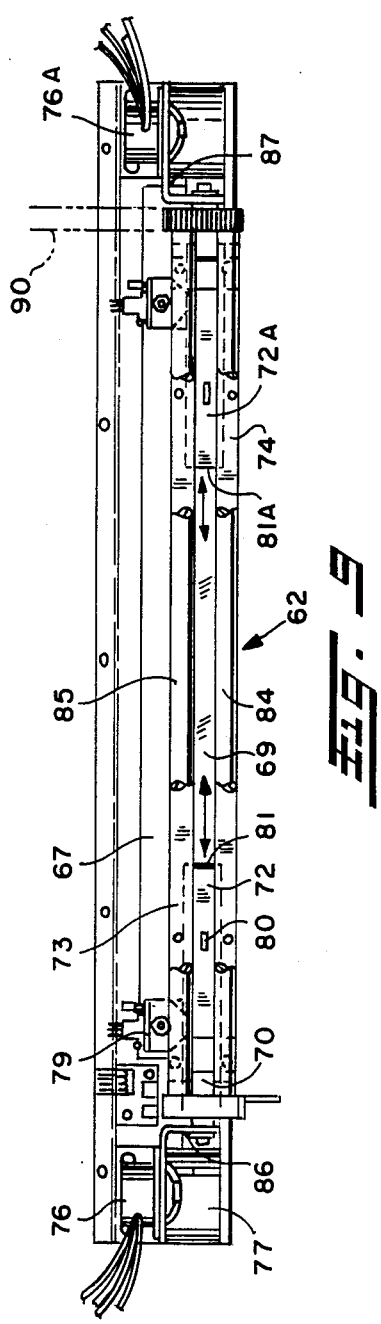
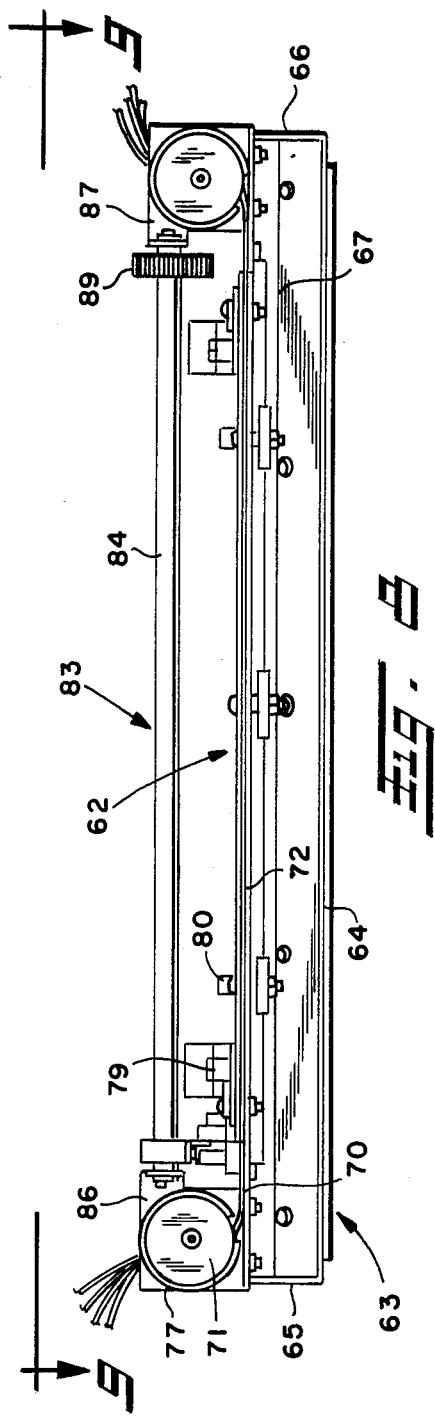

MICROFICHE PRINTING SYSTEM AND METHOD

FIELD OF THE INVENTION

The present invention relates in general to a microfiche printing system and in particular to a microfiche printing system employing automatic microfiche image masking control.

BACKGROUND OF THE INVENTION

Microfiche sheets come in at least seven different formats having different microfiche image densities and matrices. For example, type 2 microfiche has a grid matrix of five rows and twelve columns for sixty total images, with a sixth row normally being used for title information. The images on type 2 microfiche are conventionally reduced twenty times in size.

For printing, the microfiche sheets are conventionally removably positioned in a glass frame for mounting on the microfiche printing system. The mounting frame has a chrome grid matrix with the microfiche images being positioned within the frames defined by the chrome matrix. In theory, the microfiche images would just fit the chrome matrix grid frames, with the copied image on plain paper fully occupying the entire page without borders. In practice however, the microfiche images are not always properly reduced or properly oriented to provide the desired image matrix.

For example, type 2 microfiche may have the images thereon reduced twenty-four times rather than the standard twenty times. This further reduction allows legal size and letter size documents to be included on the same microfiche sheet in the normal size frame. However, the resultant microfiche image of the letter size document is smaller than the normal type 2 microfiche image frame. In addition, documents may be laid on their respective sides or entire microfiche frames may be left blank.

In printing microfiche images, the background is dark and the words or characters are clear film. Thus, if the microfiche image does not completely fill the format frame, the resultant plain paper copy will have a black border around its exterior. This black border is asthetically undesirable and is cost ineffective. The black border is caused by unneeded toner being attracted to the photoconductive imaging drum of the copy system. The black border on the plain paper copy thus results in unneeded use of the toner increasing the cost of raw materials and also results in additional toner being cycled through the printing system increasing the potential frequency of system repair or maintenance.

SUMMARY OF THE INVENTION

The principal object of the present invention is to automatically mask each microfiche image to minimize undesired black margins on the plain paper copies and to reduce toner use. The masking is controlled by initially optically backstroking or scanning each row to read and record edge location and background density information for each microfiche image on that row. This recorded data is then used on the optical printing stroke of that row to control the shutter, side masks and system aperture to mask the microfiche image being printed and to improve copy quality.

Another object of the present invention is to utilize the shutter for three different modes of operation. First, during the scanning backstroke of the microfiche row, the shutter having a mirror on its back side moves to a closed position to divert the light beam of the optics system to an array of sensors operative to read edge and density data of the microfiche images for temporary recording in a microprocessor. Second, during the optical printing stroke of the microfiche sheet, the shutter automatically is cycled to an open position when the optics are scanning each microfiche image. Third, during the printing stroke, the shutter is automatically cycled to a closed position when the optics are not scanning a microfiche image to perform a masking function, with the printing system skipping over any blank microfiche frames at high speed. In the printing stroke, the shutter is controlled by the microprocessor based upon the data temporarily recorded during the optical backstroke.

It is another object of the present invention to optically scan a row of microfiche images in one direction to collect edge and density information and then to optically print the microfiche images onto plain paper in the other direction using the scanned information to control masking, system aperture and paper size. The optical scan or backstroke is performed at high speed to record density and edge data of the microfiche images in that row. This recorded data is then used in opposite order during the printing stroke. The microfiche sheet is subsequently indexed to align the next row of microfiche images with the optical system, and the same scanning backstroke and forward printing stroke are repeated for that row. This sequence is repeated until the entire microfiche sheet has been printed row by row on plain paper copies of appropriate size and orientation.

It is still another object of the present invention to provide accurately controlled, high speed top and bottom edge masks. Two spaced coils of thin film strips are oppositely driven by high speed stepper motors to control the position of their flat ends relative to one another to correspond to the spacing of the top and bottom edges of the optical image of the microfiche image being printed. The high speed stepper motors drive spools holding the coils to extend or retract the respective film strips, depending upon the drive direction. The film strip leads are accurately guided in their respective extensions and retractions, with photoelectric home sensors being provided for each film strip lead for coordinating the relative positions of the two film masks and to provide a frame of reference for stepper motor operation.

These and other objects and advantages of the present invention will become apparent as the following description proceeds.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DETAILED DESCRIPTION OF THE DRAWINGS

In the drawings,

FIG. 2 is a plan view of a type 2 microfiche frame assembly having a type 2 microfiche sheet positioned therein, with microfiche images of different sizes and orientation appearing on the sheet matrix;

FIG. 3 is a schematic vertical cross section through the microfiche printing system showing the optics system of the present invention;

FIG. 4 is a front elevation of the shutter/mirror assembly employed in the microfiche printing system, with the shutter being shown in its closed position;

FIG. 5 is a plan view of the shutter/mirror assembly taken along the plane 5—5 of FIG. 4;

FIG. 6 is a vertical cross section of the shutter/mirror assembly taken along the plane 6—6 of FIG. 5 showing the shutter in closed position in full lines and in open position in phantom lines;

FIG. 7 is a schematic perspective of the sensor board having an array of sensors optically reading edge and density data of the microfiche images during the scanning stroke;

FIG. 8 is a front elevation of the top and bottom edge mask assembly, including an aperture control device for the light path striking the photoconductive drum; and FIG. 9 is a top plan view of the top and bottom edge mask assembly of FIG. 7.

DETAILED DESCRIPTION OF THE PREFERRED EMBODIMENT

Figure 1:
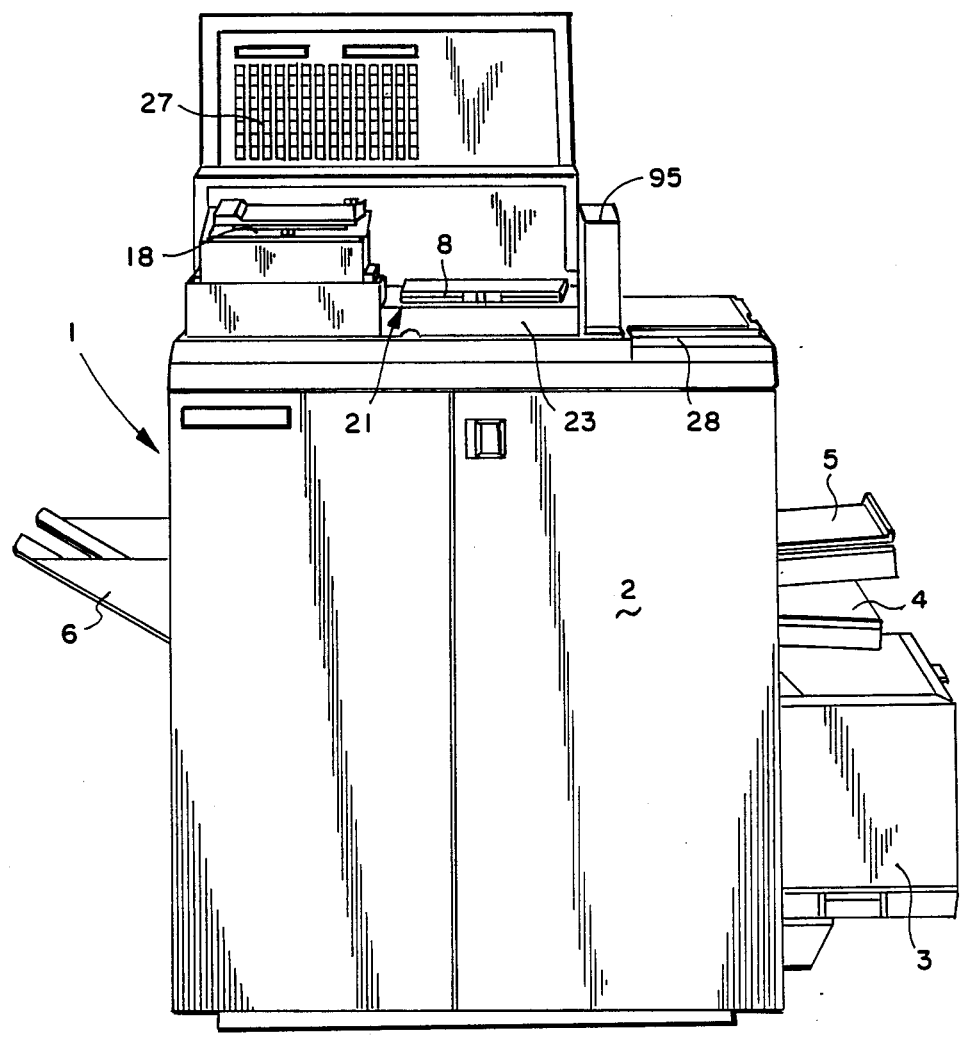
FIG. 1 is a perspective view of the microfiche printing system of the present invention.

Turning now in more detail to the drawings and initially to FIG. 1, the microfiche printing system unit, indicated generally at 1, includes a console 2 having three side bins 3–5 holding the plain paper supply of selected sizes and orientations. For example, bin 3 may include 8½×11 inch paper stock, bin 4 may include 8½×11 inch paper stock oriented on its side, and bin 5 may include 8½×14 inch paper stock. As described in more detail below, the system automatically feeds paper of the proper size through console 2 in synchronism with the microfiche sheet images being printed to provide plain paper copies of the microfiche images in delivery bin 6. The microfiche sheet to be printed is removably mounted in a frame assembly.

As shown in FIG. 2, the frame assembly, indicated generally at 8, includes a bottom flat plate 9 having a lower glass flat 10. A door 11 is hinged at 12 to the bottom plate 9. The door 11 has a second upper glass flat 13 mounted therein, which is generally in alignment with and positioned directly above the glass flat 10 when the door 11 is closed as shown in FIG. 2. When the door 11 is pivoted to an open position, a microfiche sheet of compatible format can be placed on or removed from the lower glass flat 10.

The frame assembly 8 is especially adapted to handling specific sizes or formats of microfiche sheets. As shown in FIG. 2, the upper horizontal margin of door 11 has sections numbered 1 through 12 appearing therealong corresponding to the microfiche image columns of a type 2 microfiche sheet. The vertical right hand margin of door 11 has lettered sections A through E appearing therealong corresponding to the five rows of microfiche images on a type 2 microfiche sheet. The lettered section H on door 11 corresponds to the sixth row of the microfiche sheet normally utilized for title information. The lower glass flat 10 is provided with horizontal, parallel chrome lines 15 corresponding to the proper positioning of the microfiche image rows and bottom hash marks 16 corresponding to typical microfiche image columns. While a type 2 microfiche format has been illustrated for exemplary purposes, it will be appreciated that the present invention is operable with all microfiche formats by utilizing properly formated frame assemblies and by properly programming the microprocessor of the system.

With the door in its open position, the microfiche sheet is oriented on the lower glass flat 10, with the rows of microfiche images being respectively positioned between the horizontal lines 15 as shown in FIG. 2. The microfiche sheet is also positioned, to the extent possible, to have the microfiche image columns aligned with the corresponding hash marks 16 on lower glass flat 10. To assist in this alignment function, a light table 18 is provided on console 2 for use by the operator. When proper alignment has been obtained, the door 11 is closed to retain the microfiche sheet in its properly oriented position sandwiched between the lower and upper glass flats 10 and 13, respectively.

The microfiche images on different sheets may vary in their size and orientation. As schematically illustrated in FIG. 2, a microfiche image 20A of a legal size document appears on the same format sheet with microfiche images of upright letter size documents 20B and sideways letter size documents 20C. To accomodate these different original document sizes, a greater reduction has been used to fit the microfiche images into the matrix frame. As such, the microfiche images are smaller than the format frame size leaving a clear border therearound within the frame. In addition, the microfiche images may be right justified rather than centered, as illustrated at 20D, or blank microfiche image frames may randomly exist on the microfiche sheet, as exemplified at 20E. Without masking, the clear microfiche image frame borders result in the plain paper copies having black borders. With the present invention, the irregular array or matrix of microfiche images may be optically scanned and then printed row by row with microfiche image masking to improve copy quality and reduce toner use.

To this end, the frame assembly 8 with the microfiche sheet positioned therein is mounted on a carriage assembly 21 of the printing system. The carriage assembly 21 moves the frame assembly 8 and microfiche sheet positioned therein relative to the optics system indicated generally at 22 in FIG. 3. The carriage assembly is mounted in a protective well 23 on the top of console 2 and includes a first shuttle 25 and a second shuttle 26. The first and second shuttles are moved together in the X direction, while second shuttle 26 moves relative to first shuttle 25 in the Y direction.

The frame assembly 8 is initially positioned to align the right hand microfiche image in row E with the light path of the optical system. The microfiche sheet format being printed can be keyed into the system microprocessor by using keyboard 27 on top of console 2. The operator then initiates the scanning and printing sequence by pressing the print start switch 28 on console 2.

The carriage assembly 21 and frame assembly 8 are then moved at high speed in the X direction as indicated by arrow 30 in FIGS. 2 and 3 to provide a backstroke or scanning stroke of all microfiche images appearing in that row as described in more detail below. At the conclusion of the scanning stroke, the carriage assembly, frame assembly and microfiche sheet are driven in the opposite X direction indicated by arrow 31 optically to print the microfiche images in row E in reverse order to the scanning sequence. At the conclusion of the printing stroke in direction 31, the second shuttle 26, frame assembly 8 and microfiche sheet are indexed in the Y direction indicated by arrow 32 in FIG. 2 by second shuttle 26 moving relative to first shuttle 25. This indexing movement aligns row D of the microfiche sheet with the optical system of FIG. 3. This scanning, printing and indexing cycle for each row is repeated until all five rows have been printed for a type 2 microfiche format.

Turning now to the optical system of FIG. 3, the carriage assembly 21 with the frame assembly mounted thereon is shown in full lines at the beginning of the scanning stroke and in phantom lines at the end of the scanning stroke. As the carriage assembly 21 is driven at high speed through the scanning stroke, the optical system 22 is scanning each microfiche image in that row and temporarily recording edge location and background density data for subsequent use.

The optical system 22 includes a light source 34 emitting a beam of light travelling through the optical system in a light path indicated generally at 35. The center line of the light beam optics is indicated at 35A while the used portion of the optical cone is indicated at 35B. The light beam emanating from source 34 passes through a condensing lens 36 operative to focus the light beam on the microfiche image in alignment therewith. The light beam sequentially passes through upper flat 13, the microfiche image, lower flat 10 and an objective lens 37. The objective lens 37 is spring biased into sliding engagement with the bottom movable surface of bottom flat 10 to maintain constant spacing between the objective lens and the microfiche images being scanned and printed. The light beam emanating from lens 37 is reflected by mirror 38 to a pair of zoom mirrors 40.

The zoom mirrors are simultaneously adjustable to reposition the same for the magnification required to enlarge from the microfiche image size being printed to the desired print or copy size. The zoom mirrors 40 are driven as a pair by a high speed stepper motor between the respective magnification positions required, as exemplified in phantom at 40A and 40B. The light beam is sequentially reflected off the pair of zoom mirrors 40 toward a shutter/mirror assembly, indicated generally at 41.

The shutter/mirror assembly 41 is best shown in FIGS. 4 through 6. The shutter/mirror assembly 41 has a U-shape frame comprising a base 42 and spaced end walls 43 and 44. A shaft 46 extends between the end walls 43 and 44 and is rotatably mounted thereto. A shutter 47 is secured to the shaft 46 and rotates therewith. The shutter 47 is automatically reciprocally driven between a closed position blocking the light beam as shown in full lines in FIGS. 3 and 6 and an open position allowing the light beam to pass as shown in phantom lines at 47A in FIGS. 3 and 6. The shutter 47 is driven between these two positions by a rotary solenoid motor 48 mounted in cantilever fashion to the outside of end wall 44 selectively to drive rotable shaft 46. The rotary solenoid motor 48 has electrical connections 49 to the microprocessor of the system, shown schematically at 51 in FIG. 3.

When the solenoid motor 48 has driven the shutter 47 to its closed position, the shutter assists in performing the scanning and recording function of the optical system 22. To this end, the back surface of shutter 47 has an elongated mirror 52 mounted thereon. With the shutter in its closed position, the mirror 52 reflects the light beam 35 to a second reflective mirror 53 mounted at an angle on shutter/mirror assembly 41. The second mirror 53 is fixedly positioned relative to the shutter/mirror assembly 41 by a rigid support bracket 54 extending between and being secured to end walls 43 and 44 of the assembly frame. The light beam reflected by second mirror 53 is directed toward a senser board, indicated generally at 56.

As best shown in FIG. 7, the senser board 56 includes an elongated linear array of photodiode sensers 57 along one edge thereof. These sensers are receiving the optical information carried by the light beam that has passed through and been focused on the microfiche images on the microfiche sheet. Seventy-two sensers on 0.02 inch centers have been used for this array. Each senser has two hundred fifty six different levels of light intensity sensitivity. The light intensity level of each senser during the scanning stroke is sequentially measured and recorded in an analog to digital conversion in microprocessor 51, with the individual sensers after normalization being polled to determine, for example, if an image edge is being sensed or if lines of print on the image are being sensed.

The optical image information sensed and converted by senser board 56 includes the location data of each side edge of the microfiche image being scanned, the top and bottom edge thereof and the background density data thereof. The microfiche image data sensed is temporarily recorded in microprocessor 51 electronically coupled to the senser board 46. The edge and density data temporarily recorded during the scanning stroke is then used to control the optical system 22 during the printing stroke.

In the printing stroke, the shutter 47 is periodically in its open position 47A allowing the optical path of the light beam to pass through the shutter/mirror assembly 41 to reflective mirror 60. The light beam is reflected off mirror 60 and directed toward the photoconductive reproduction drum 61. The optical path between mirror 60 and drum 61 passes through an edge mask assembly, indicated generally at 62.

As best shown in FIGS. 8 and 9, the edge mask assembly includes a base frame 63 including bottom wall 64, sidewalls 65 and 66 and an angled front wall 67. The angled front wall 67 has an elongated slot 69 therein providing an opening to pass the light beam through to drum 61.

The length of this opening is effectively controlled by two edge masks selectively moving toward and away from one another. The edge masks operate in synchronism in opposite directions, but are otherwise identical in their construction. A single edge mask will thus be described below, with the opposite edge mask being identified by the same numbers followed by the suffix A.

Turning to the left edge mask as viewed in FIGS. 8 and 9, a thin and narrow, flexible strip material 70 is wound on a spool 71. The lead 72 of the strip material 70 is flat and is guided in its extension and retraction. For this purpose, strip 70 is wider than slot 69 and thus has its bottom marginal edges supported by inclined wall 67. The top marginal edges of strip 70 are slidingly restrained by opposed edge guides 73 and 74 mounted on top of angled wall 67. The lead 72 of the strip is extended and retracted by the spool 71 being rotatably driven by stepper motor 76, with the wound strip on spool 71 being retained and guided by arcuate retaining wall 77.

The position of lead 72 relative to the slot 69 is controlled by the number of steps the stepper motor 76 has taken relative to its home position. This home position is established by a photosenser 79 mounted on inclined wall 67 adjacent the outer end of slot 69. This photosenser 79 cooperates with an upstanding photosensitive tab 80 mounted on the strip lead 72 adjacent its forward end. When the photosensitive tab is in alignment with photosenser 79, the lead 72 is at its outermost position and the stepper motor 76 will not retract the lead any further. It will be appreciated that the home position for the stepper motor may be established at any selected location of the lead relative to the slot 69.

In operation, the two leads 72 and 72A are synchronously selectively driven by stepper motors 76 and 76A from these home positions toward and away from one another. The photosenser 79 and photosenser tab 80 when in alignment establish the home position to coordinate the relative positions of the two leads 72 and 72A and to provide control over the stepper motors 76 and 76A.

The respective ends 81 and 81A of the leads 72 and 72A, respectively, perform a masking function to the light beam passing through slot 69. The separation between the lead ends is controlled during the printing stroke in accordance with the top and bottom edge location data temporarily recorded during the scanning stroke for the microfiche image being printed. Thus, for example, the respective ends 81 and 81A of the leads 72 and 72A may be driven toward one another by stepper motors 76 and 76A to position the same relative to the slot 69 in accordance with the top and bottom edge data recorded during scanning effectively to mask the microfiche image optics to the edges of the microfiche image being printed to eliminate or minimize the clear microfiche border appearing therearound. If the next microfiche image being printed is larger, the leads 72 and 72A are driven away from one another in accordance with the temporarily recorded data to again effectively mask the optical image to the actual microfiche image being printed.

The microfiche image thus exposed as a latent image on the photoconductive drum is substantially the size of the plain paper being printed. This latent image is transferred to the paper traveling along paper feed path 82 toward delivery bin 6. The photoconductive drum reproduction technique is conventional except that the charges on the drum and toner are opposite to the conventional reproduction system because microfiche has dark background and clear characters instead of the reverse. The exposure of the optical images onto the drum can also be controlled to compensate for varying background densities of the respective microfiche images being printed as sensed during the scanning stroke.

For this purpose, an aperture control device, indicated generally at 83, may be mounted on and be a part of the edge masking assembly 62. The aperture control device 83 includes two parallel rods 84 and 85 rotatably mounted to and extending between L-shape brackets 86 and 87. A gear 89 is mounted to parallel rods 84 and 85 adjacent one end thereof. An endless drive belt 90 is trained around gear 89 and a drive gear 91 on stepper motor 92. Stepper motor 92 through the belt and gear drive train is operative selectively to rotate parallel rods 84 and 85. Depending upon the degree of rotation of the rods relative to the optical path passing through slot 69, the effective size of the aperture defined therebetween can be enlarged or decreased. By enlarging the aperture size, the light exposure on the photoconductive drum 61 is increased and vice versa. The position of the parallel rods 84 and 85 during printing of a given microfiche image is controlled to provide drum exposure correlated to the background density data temporarily recorded for that microfiche image during the high speed scanning backstroke to provide improved print quality. The stepper motor 92 is electronically coupled to the microprocessor 51 for this control function.

Although the operation of the microfiche printing system and method is believed apparent from the above description, an operational statement is set forth briefly hereinafter. The frame assembly 8 with the microfiche sheet to be printed positioned therein is mounted on the carriage assembly 21. The system is programmed to handle the microfiche sheet format being printed. The microfiche sheet is positioned so that the lower right hand microfiche image is in alignment with the optical path 35 of optical system 22. The optical light sensers 57 are also normalized relative to one another to provide consistent levels of light intensity sensitivity across the entire senser array.

Initially, the light beam is passed through the stationery microfiche image and objective lens 37 and is then reflected by mirror 39 and zoom mirrors 40 toward pilot mirror 94. The outer portions of the optical cone 35B of the light beam strike pilot mirror 94 and are reflected to pilot screen 95. The optical path to reach pilot screen 95 from zoom mirrors 40 is substantially equal to the optical path to reach drum 61 from zoom mirrors 40. As apparent from FIGS. 1 and 3, the system operator views the magnified image of the microfiche image at pilot screen 95 and may adjust lenses as required to bring the optical system into focus for the microfiche sheet being printed. Thereafter, the scanning, masking, printing and indexing sequence is begun.

In the initial scanning stroke in the direction of arrow 30, the shutter 47 is in its closed position. The light beam of the optics system is sequentially passed through all the microfiche images in the row being scanned. This light beam is reflected by mirrors 52 and 53 to the senser board 56. The optical sensing path from shutter 4 to sensers 57 is substantially equal in length to the alternate optical printing path from shutter 47 to drum 61, whereby the image edge data recorded during scanning can readily be correlated to the latent image edge locations to be impressed upon the photoconductive drum.

The microfiche images are optically scanned by sensers 57, with the edge location and background density data being interpreted and temporarily recorded by senser board 56, microprocessor 51 and associated electronic circuitry. When the carriage assembly 21 has reached the end of its scanning stroke, the edge location and background density data has been temporarily recorded for the entire row and is used in the opposite sequence during the printing stroke.

During the printing stroke, the carriage assembly 21 is driven in the direction indicated by arrow 31 to sequentially advance the microfiche images in that row back through the optical system 22. The printing stroke and the operation of the optical system during the printing stroke are controlled in accordance with the edge and density data temporarily recorded during the scanning stroke. In this regard, the shutter 31 remains closed in a masking function until the leading edge of the microfiche image to be printed is intersected by the light beam of the optical system. At that point, the microprocessor 34 operates to open shutter 47 to allow the light beam to pass through the shutter/mirror assembly. Concurrently, the top and bottom edge masks have been cycled to proper spacing relative to one another to mask the optical beam corresponding to the top and bottom edge data recorded during scanning. The parallel rods 84 and 85 have also been positioned relative to the light beam to provide the proper drum exposure for the background density data recorded for that microfiche image during the scanning stroke.

When the light beam of the printing optics reaches the trailing edge of the microfiche image being driven therepast, the shutter is automatically moved to its closed position to mask the other side edge in accordance with the edge data recorded during the scanning stroke. Thereafter, the speed of the carriage assembly is increased until the next microfiche image is reached by the optical system during the printing stroke. If the microfiche sheet has a blank frame in this position, the high speed traversal of the carriage assembly in the printing stroke is continued until the next microfiche image is encountered.

Assuming the next microfiche image encountered is a legal size document rather than a letter size document, the microprocessor during carriage assembly traversal is setting up the printing system to handle the same. Specifically, during carriage assembly traversal, the edge masks 72 and 72A are adjusted relative to one another effectively to mask the top and bottom edges of the legal document microfiche image, the aperture control device is adjusted for exposure control and the legal size paper supply bin is activated to copy onto legal size plain paper. Each of the microfiche images in the row is subjected to this optical printing sequence, which is effectively controlled by the edge and density data recorded during the scanning stroke until the entire row has been printed.

Thereafter, the frame assembly 8 and microfiche sheet thereon are indexed in the Y direction as indicated by arrow 32 to position the next row of microfiche images into alignment with the optical system. The scanning, printing and masking functions are then performed on the next row in the same sequence. These same steps are performed on each row of the microfiche sheet to complete the printing process thereon.

By providing automatic mask and shutter control, the unused border portions of the microfiche image frames are optically blocked to minimize the black borders appearing on the printed copies, thereby to improve copy aesthetics and to reduce toner use. By providing automatic exposure control based upon the background density data recorded, the quality of the printed copy is improved. By providing automatic paper selection for the microfiche image being printed, the microfiche image is printed on a paper size corresponding to the original size with proper magnification of the letters and characters.

It will be apparent from the foregoing that changes may be made in the details of construction and configuration without department from the spirit of the invention as defined in the following claims.

We claim:

1. A microfiche printing system comprising
    a sheet having a plurality of microfiche images thereon in a grid matrix of columns and rows;
    a frame assembly carrying the sheet on at least one transparent flat;
    a carriage assembly removably receiving the frame assembly and microfiche sheet carried thereby, the carriage assembly being driven relative to a light path of an optics system optically to scan a row of microfiche images in one direction during a scanning stroke, optically to print the row of microfiche images onto plain paper in the other direction during a printing stroke and to thereafter index the next row of microfiche images into alignment with the optics system to repeat the scanning and printing sequences until each microfiche image row on the sheet has been sequentially optically scanned and printed;
    the optics system being operative to temporarily record edge locations of each microfiche image in the row during the scanning stroke and to effectively mask each microfiche image to its recorded edge locations during the printing stroke.

2. The microfiche printing system of claim 1 wherein the optics system includes a shutter assembly having a shutter reciprocally movable between a closed position and an open position, the shutter being closed to block the light path during the scanning stroke and during carriage traversal between microfiche images while in the printing stroke and being open during the printing of microfiche images in the printing stroke.

3. The microfiche printing system of claim 2 wherein the shutter assembly includes a first mirror on at least one side of the shutter, the first mirror being operative when the shutter is closed to transmit optical images of the microfiche images toward a senser array for sensing edge locations of those microfiche images during the scanning stroke.

4. The microfiche printing system of claim 3 wherein the shutter assembly includes a second fixed mirror aligned with the first mirror to reflect the optical images to the senser array during the scanning stroke.

5. The microfiche printing system of claim 4 wherein the senser array is coupled to a microprocessor for temporarily recording the edge locations sensed in the scanning stroke and for controlling the shutter movement through a high speed rotater in the printing stroke in accordance with the edge data temporarily recorded.

6. The microfiche printing system of claim 5 wherein the optics system further includes an edge mask assembly having edge masks automatically controlled by said microprocessor effectively to mask the top and bottom edges of the microfiche images while the shutter is effectively masking the side edges of the microfiche images.

7. The microfiche printing system of claim 6 wherein the edge mask assembly includes aligned film strips having film leads synchronously driven toward and away from one another during the printing stroke by first and second high speed stepper motors to control the distance therebetween in accordance with the edge data previously sensed during the scanning stroke for the microfiche image then being printed.

8. The microfiche printing system of claim 6 wherein the film leads are guided in flat travel toward and away from one another, with the remainder of the film strips respectively being coiled on aligned spools respectively driven by said first and second stepper motors.

9. The microfiche printing system of claim 8 wherein the film leads respectively have photosensitive tabs equally spaced from and adjacent to the film lead ends and the edge mask assembly includes spaced photosensors positioned at a predetermined position, the photosensers and photosenser tabs cooperating to provide home positions for the film leads to provide a frame of reference for operating the first and second stepper motors.

10. The microfiche printing system of claim 6 further including the an aperture control device automatically driven to vary the size of a light aperture for the light path of the optics system leading to a photoconductive reproduction drum, the size of the light aperture being controlled during the printing stroke in accordance with microfiche image density data temporarily recorded during the scanning stroke.

11. The microfiche printing system of claim 10 wherein the aperture control device includes two parallel rods rotated by a third high speed stepper motor, the position of the rods relative to the light path controlling the light aperture size.

12. The microfiche printing system of claim 1 wherein the optics system includes a shutter to mask the side edges of the microfiche images and film strip edge masks to mask the top and bottom edges of the microfiche images during the printing stroke.

13. A method for printing microfiche images from a sheet containing rows and columns of microfiche images onto plain paper comprising the steps of scanning a row of microfiche images through an optics system in one direction temporarily to record edge location data for each microfiche image in that row, passing the microfiche images in that row through the optics system in the opposite direction for printing, effectively masking the respective microfiche images in that row during printing in accordance with the edge location data recorded during scanning, indexing the sheet to align the next row of microfiche images with the optics system to repeat the scanning, passing and masking sequence on that next row and repeating the scanning, passing, masking and indexing steps until all rows of microfiche images on the sheet have been printed.

* * * * *